US011105243B2

(12) United States Patent
Nakajima et al.

(10) Patent No.: US 11,105,243 B2
(45) Date of Patent: Aug. 31, 2021

(54) EXHAUST HEAT RECOVERY APPARATUS

(71) Applicant: Marelli Corporation, Saitama (JP)

(72) Inventors: Shirou Nakajima, Saitama (JP);
Mizuki Hayashida, Saitama (JP);
Hiroaki Masubuchi, Saitama (JP);
Tooru Hisanaga, Saitama (JP);
Katsufumi Inoue, Saitama (JP)

(73) Assignee: Marelli Corporation, Saitama (JP)

( * ) Notice: Subject to any disclaimer, the term of this patent is extended or adjusted under 35 U.S.C. 154(b) by 0 days.

(21) Appl. No.: 17/056,941

(22) PCT Filed: Mar. 28, 2019

(86) PCT No.: PCT/JP2019/013649
§ 371 (c)(1),
(2) Date: Nov. 19, 2020

(87) PCT Pub. No.: WO2019/225150
PCT Pub. Date: Nov. 28, 2019

(65) Prior Publication Data
US 2021/0215083 A1    Jul. 15, 2021

(30) Foreign Application Priority Data

May 22, 2018  (JP) .............................. JP2018-097975

(51) Int. Cl.
*F01N 5/02*    (2006.01)
*F01N 3/02*    (2006.01)

(52) U.S. Cl.
CPC ............. *F01N 5/02* (2013.01); *F01N 3/0205* (2013.01); *F01N 2240/02* (2013.01); *F01N 2240/36* (2013.01); *F01N 2410/00* (2013.01)

(58) Field of Classification Search
CPC ............. F01N 2240/02; F01N 2410/00; F01N 2240/36; F01N 3/2889; F01N 3/0205; Y10T 137/7902
See application file for complete search history.

(56) References Cited

U.S. PATENT DOCUMENTS 10,961,884 B1 *  3/2021  Dadam .................... F01N 9/00
10,982,580 B2 *  4/2021  Murata ................... F01N 3/227
(Continued)

FOREIGN PATENT DOCUMENTS

JP          2012-031796 A       2/2012
JP          2012-184678 A       9/2012
(Continued)

*Primary Examiner* — Anthony Ayala Delgado
(74) *Attorney, Agent, or Firm* — Young Basile Hanlon & MacFarlane, P.C.

(57) ABSTRACT

A housing has a heat exchange flow passage which branches from the main exhaust gas flow passage and converges to the main exhaust gas flow passage through the heat exchanger. The valve has a valve pipe constituting the main exhaust gas flow passage in the exhaust pipe and a valve body which rotates to contact a seat part downstream of the valve pipe in an exhaust gas flow direction such that the exhaust gas flows to the heat exchange flow passage. An out port of the heat exchange flow passage which converges to the main exhaust gas flow passage is disposed upstream of a downstream side distal end of the valve pipe in the exhaust gas flow direction, and the downstream side distal end of the valve pipe in the exhaust gas flow direction is disposed upstream of a downstream side distal end of the heat exchanger in the exhaust gas flow direction.

4 Claims, 4 Drawing Sheets

(56) References Cited

U.S. PATENT DOCUMENTS

| | | | |
|---|---|---|---|
| 2012/0222838 A1* | 9/2012 | Hisanaga | F01N 13/082 |
| | | | 165/96 |
| 2012/0297754 A1 | 11/2012 | Hisanaga et al. | |
| 2014/0246173 A1* | 9/2014 | Cheadle | F02M 26/26 |
| | | | 165/103 |
| 2017/0362988 A1* | 12/2017 | Matsuura | F28F 3/06 |

FOREIGN PATENT DOCUMENTS

| | | |
|---|---|---|
| JP | 2012-246835 A | 12/2012 |
| JP | 2013-124727 A | 6/2013 |
| JP | 2016-044666 A | 4/2016 |
| JP | 2018-071414 A | 5/2018 |
| JP | 2018-188994 A | 11/2018 |

* cited by examiner

EXHAUST HEAT RECOVERY APPARATUS

CROSS-REFERENCE TO RELATED APPLICATION(S)

This application claims priority to Japanese Patent Application No. 2018-097975, filed May 22, 2018, the entire disclosure of which is hereby incorporated by reference.

TECHNICAL FIELD

The present invention relates to an exhaust heat recovery apparatus.

BACKGROUND

JP2016-44666A below discloses an exhaust heat recovery apparatus. The exhaust heat recovery apparatus disclosed in JP2016-44666A includes a main exhaust gas flow passage, a bypass flow passage, a heat exchanger and a valve device. The main exhaust gas flow passage introduces an exhaust gas of an internal combustion engine. The bypass flow passage is a flow passage that bypasses the main exhaust gas flow passage. The heat exchanger is provided in the bypass flow passage for exchanging heat between the exhaust gas in the bypass flow passage and a coolant of the internal combustion engine. The valve device opens and closes the main exhaust gas flow passage and the bypass flow passage downstream of the heat exchanger. Between the valve device and the heat exchanger, the bypass flow passage is connected to an EGR via a recirculation passage.

SUMMARY

According to the exhaust heat recovery apparatus disclosed in JP2016-44666A, there is a concern that the valve opening becomes unstable due to aging deterioration of the valve device or the like. Unstable valve opening affects the exhaust flow and increases heat recovery by the heat exchanger in a non-recovery mode.

It is an object of the present disclosure to provide an exhaust heat recovery apparatus capable of suppressing the heat recovery by the heat exchanger in the non-recovery mode.

According to an aspect of the present invention, an exhaust heat recovery apparatus includes an exhaust pipe forming a main exhaust gas flow passage in which an exhaust gas flows, a housing attached to the exhaust pipe, the housing including a heat exchanger, and a valve disposed in the exhaust pipe, the valve being configured to open and close the main exhaust gas flow passage. The housing has a heat exchange flow passage which branches from the main exhaust gas flow passage and converges to the main exhaust gas flow passage through the heat exchanger. The valve has a valve pipe constituting the main exhaust gas flow passage in the exhaust pipe and a valve body which rotates to contact a seat part downstream of the valve pipe in an exhaust gas flow direction such that the exhaust gas flows to the heat exchange flow passage. An out port of the heat exchange flow passage which converges to the main exhaust gas flow passage is disposed upstream of a downstream side distal end of the valve pipe in the exhaust gas flow direction, and the downstream side distal end of the valve pipe in the exhaust gas flow direction is disposed upstream of a downstream side distal end of the heat exchanger in the exhaust gas flow direction.

DETAILED DESCRIPTION

Embodiments of the present invention will be described below with reference to the drawings.

First Embodiment (Configuration of Exhaust Heat Recovery Apparatus)

Figure 1:
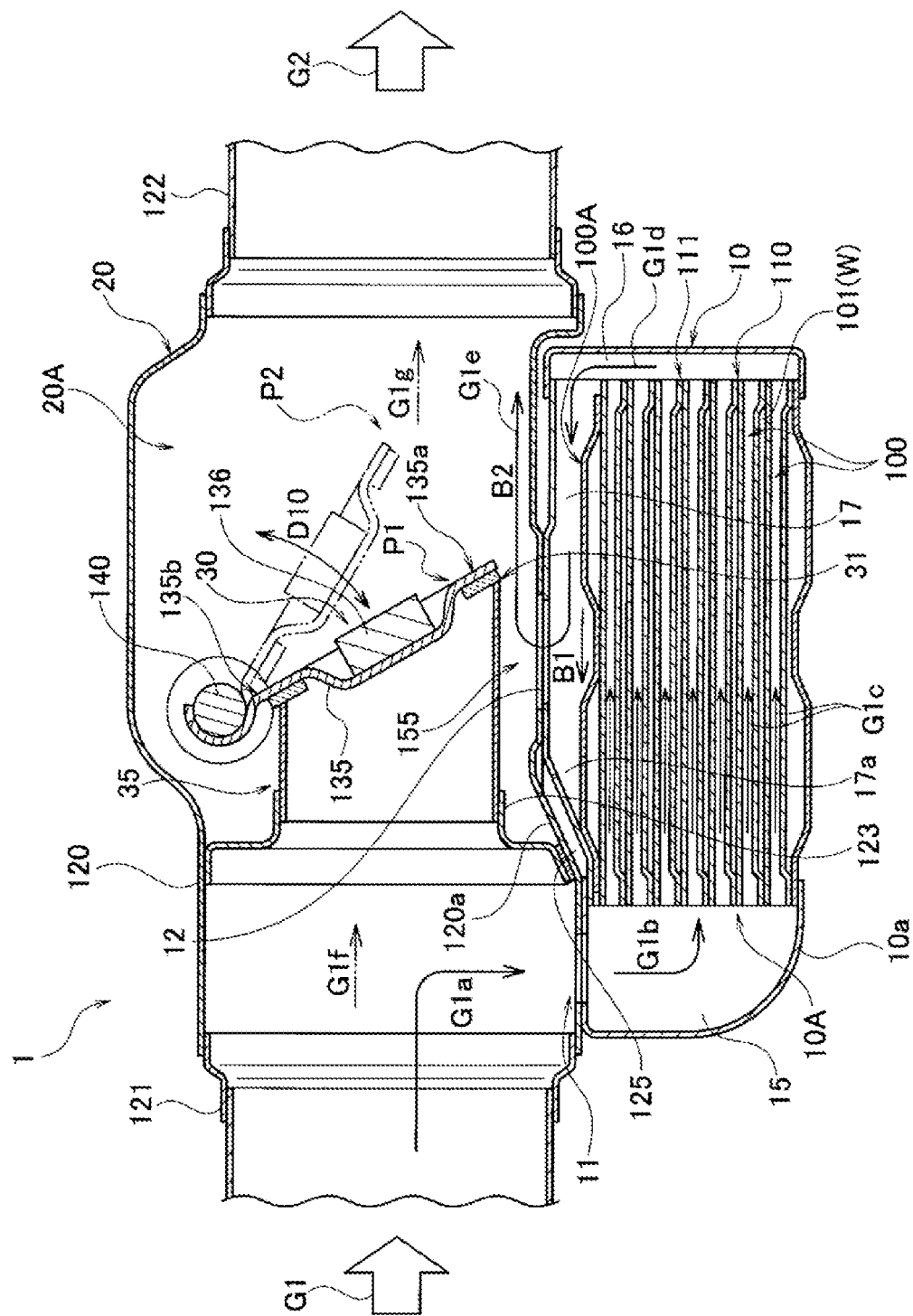
FIG. 1 is a cross-sectional view of an exhaust heat recovery apparatus according to the first embodiment.

An exhaust heat recovery apparatus 1 according to the first embodiment is disposed in the middle of an exhaust pipe of an internal combustion engine of a vehicle, and recovers heat of an exhaust gas of the internal combustion engine. The exhaust heat recovery apparatus 1 operates in a heat recovery mode that recovers the heat of the exhaust gas or in a non-recovery mode that does not recover the heat. For convenience of explanation, an upper side and a lower side of the exhaust heat recovery apparatus 1 in FIG. 1 are defined as an upper part and a lower part, respectively. However, an orientation of the exhaust heat recovery apparatus 1 when mounted on the vehicle is not limited to that shown in FIG. 1.

As shown in FIG. 1, the exhaust heat recovery apparatus 1 includes a main exhaust gas flow passage 20A, a heat exchange flow passage 10A, a heat exchanger 111, and a valve 30. The main exhaust gas flow passage 20A has a bypass part (bypass pipe) 20 into which an exhaust gas G1 of the internal combustion engine is introduced. The exhaust gas G1 passing through the bypass part 20 bypasses the heat exchanger 111. The heat exchange flow passage 10A has a heat exchange part (heat exchange pipe) 10 which branches from the main exhaust gas flow passage 20A at a gas flow-in port 11 and returns to the main exhaust gas flow passage 20A at a gas flow-out port 12. The heat exchange part 10 is positioned adjacent to the bypass part 20. The heat exchanger 111 is disposed in the heat exchange flow passage 10A, and exchanges heat between the exhaust gas G1 and a heat carrier W such as a coolant. The valve 30 is a so-called flap valve, which is disposed downstream of the gas flow-in port 11 of the main exhaust gas flow passage 20A and has a valve body 135 which opens and closes the main exhaust gas flow passage 20A.

An exhaust gas G1e, which has returned to the main exhaust gas flow passage 20A through the gas flow-out port 12, flows around the valve 30 through a subsidiary flow passage 155 that is not closed by the valve body 135 in a closed position P1, and returns to the main exhaust gas flow passage 20A. In the heat recovery mode in which the valve body 135 is in a closed state, exhaust gases G1a and G1b exchange heat with the heat carrier W by the heat exchanger 111 while passing through the heat exchange flow passage 10A, and an exhaust heat is recovered.

In the non-recovery mode in which valve body 135 is in an open state, an exhaust gas G1f is discharged as exhaust gases G1g and G2 through the main exhaust gas flow passage 20A (bypass passage of the heat exchanger 111). At this time, a pressure in the main exhaust gas flow passage 20A is high on an upstream side of the valve 30, and the pressure is low on a downstream side of the valve 30. A pressure in the subsidiary flow passage 155 disposed upstream of the valve 30 (around a valve pipe 35 described later) is also high because the pressure is not affected by an exhaust gas G1g discharged from the valve 30. Therefore, since the pressures on the upstream side and the downstream side (subsidiary flow passage 155) of the heat exchanger 111 are high, it is possible to effectively suppress the flow of the exhaust gases G1a and G1b through the heat exchange flow passage 10A. In the non-recovery mode, the heat recovery by the heat exchanger 111 is surely suppressed.

When the valve body 135 is operated between the open state and the closed state by a thermoactuator 200 or the like described later, the valve opening may become unstable due to aging deterioration of the actuator 200 or the like. However, according to exhaust heat recovery apparatus 1 of the present embodiment, even if the valve opening is unstable, the differential pressure of the heat exchange flow passage 10A (differential pressure between the upstream side and the downstream side of the heat exchanger 111) does not fluctuate due to a valve opening difference. Therefore, the heat recovery by the heat exchanger 111 in the non-recovery mode can be surely prevented.

In the non-recovery mode in which valve body 135 is in the open state, the exhaust gas G1a flows into the heat exchange flow passage 10A only slightly. A slight amount of the exhaust gas G1b entering the heat exchange flow passage 10A is returned to the subsidiary flow passage 155 upstream of the valve 30, and is affected by the degraded opening of the valve 30 for the first time when it flows downstream of the valve 30. Therefore, the differential pressure of the heat exchange flow passage 10A (differential pressure between the upstream side and the downstream side of the heat exchanger 111) is hard to fluctuate as mentioned above, and the heat recovery by the heat exchanger 111 in the non-recovery mode can be surely prevented. In addition, since the subsidiary flow passage 155 functions as an insulating air layer, heat transfer from the bypass part 20 to the heat exchange part 10 can be suppressed. As a result, the heat recovery by the heat exchanger 111 in the non-recovery mode can be suppressed more reliably.

A return flow passage 17 is provided on the main exhaust gas flow passage 20A side of the heat exchange flow passage 10A, that is, on the side of the heat exchanger 111 (upper side in FIG. 1), to turn around an exhaust gas G1d that has passed through the heat exchanger 111 toward the gas flow-out port 12. That is, the return flow passage 17 is disposed between the heat exchanger 111 and the bypass part 20 side inner wall of the heat exchange part 10. In the non-recovery mode in which the valve body 135 is in the open state, since the exhaust gas G1d does not flow through the return flow passage 17, the return flow passage 17 functions as the insulating air layer between the heat exchanger 111 and the main exhaust gas flow passage 20A. Therefore, heat of the high-temperature exhaust gases G1f and G1g flowing through the main exhaust gas flow passage 20A can be avoided as much as possible from being transferred to the heat exchanger 111. That is, the heat recovery by the heat exchanger 111 in the non-recovery mode can be suppressed more reliably. In the heat recovery mode in which the valve body 135 is in the closed state, the exhaust gas G1e flowing through the return flow passage 17 exchanges heat with the heat exchanger 111 again to recover the residual heat. Therefore, the heat exchange efficiency is improved.

An insulating air layer 125 is formed downstream of the gas flow-in port 11 between the main exhaust gas flow passage 20A and the heat exchange flow passage 10A. In the non-recovery mode in which the valve body 135 is the open state, high heat of the high-temperature exhaust gases G1f and G1g flowing through the main exhaust gas flow passage 20A can be avoided as much as possible from being transferred to the heat exchange flow passage 10A. Therefore, the heat recovery by the heat exchanger 111 in the non-recovery mode can be suppressed more reliably.

(Configuration of Bypass Part)

Figure 2:
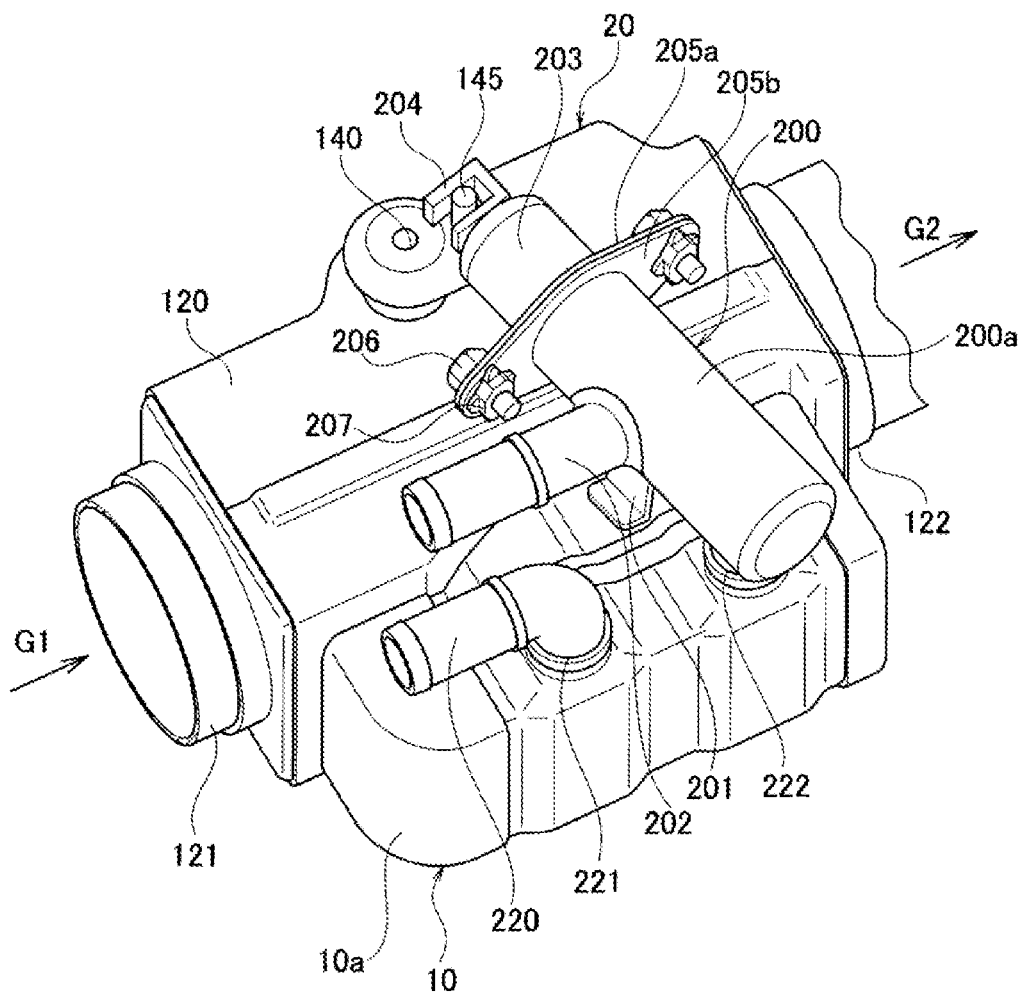
FIG. 2 is a perspective view of the exhaust heat recovery apparatus.

As shown in FIGS. 1 and 2, the bypass part 20 constituting the main exhaust gas flow passage 20A includes a bypass part main body 120. The bypass part main body 120 is formed into a hollow-cylindrical shape (e.g., a rectangular cylindrical shape, a cylindrical shape, or the like) by a metal, for example, and extends in the front and rear directions of the vehicle. The bypass part main body 120 includes a cylindrical gas inlet port 121 provided on an intake side of the exhaust gas G1 and a cylindrical gas outlet port 122 provided on an exhaust side of the exhaust gas G2. The valve pipe 35 forming a part of the valve 30 is disposed substantially in the center of the bypass part main body 120.

The valve pipe 35 of the valve 30 constitutes a double pipe structure with the bypass part main body 120 of the bypass part 20. The valve pipe 35 let the main exhaust gas flow passage 20A communicate only within the valve pipe 35. An upstream end of the valve pipe 35 is fixed to an inner surface of the bypass part main body 120 and closes a space between the valve pipe 35 and the bypass part main body 120. The gas flow-out port 12 described above is arranged beside the valve pipe 35 along the axis line of the valve pipe 35, and the subsidiary flow passage 155 is formed around a circumference of the valve pipe 35. The downstream end of the valve pipe 35 is formed as an inclined portion which projects downwardly toward the downstream. The inclined portion constitutes a valve seat 31 against which the valve body 135 of the valve 30 abuts. The inclination of the valve seat 31 (inclined portion) is about 10 to 60 degrees with respect to the exhaust gas flow direction, although it is not limited to this range.

(Valve Configuration)

The valve 30 includes a rotatable rotation shaft 140, the valve body 135 having one end fixed to the rotation shaft 140, and an actuator 200 for rotating the rotation shaft 140 (see FIG. 2). The rotating end 135a of the valve body 135 is disposed downstream of the gas flow-out port 12. A base end 135b of the valve body 135 may be disposed upstream of the rotation shaft 140. The valve body 135 is configured to swing in a direction D10 between the closed position P1 in contact with the valve seat 31 and the open position P2 away from the valve seat 31 in accordance with the rotation of the rotation shaft 140 by the actuator 200.

As described above, the valve seat 31 has the inclined portion. Compared to the case where the valve seat 31 is perpendicular to the straight-flowing component G1f of the exhaust gas G1, the pressure receiving area of the valve body 135 receiving the straight-flowing component G1f can be increased when the valve seat 31 is inclined. Therefore, the load of the actuator 200 when rotating the valve body 135 from the closed position P1 to the open position P2 can be reduced, thereby improving the valve opening performance of the valve 30. Consequently, it is possible to switch from the heat recovery mode to the non-recovery mode quickly.

The valve body 135 is biased toward the valve seat 31 by an elastic member (not shown) such as a spring. Therefore, the valve body 135 can be more reliably held in the closed position P1 in the heat recovery mode. Further, on a surface of an exhaust gas downstream side of the valve body 135, a weight (mass damper) 136 is attached. Therefore, resonance of the valve body 135 caused by pulsation of the exhaust gas can be suppressed by the mass of the weight 136.

(Configuration of Heat Exchange Part)

As shown in FIG. 1, the heat exchange part 10, which constitutes the heat exchange flow passage 10A including the heat exchanger 111, includes a metal housing 10a. The heat exchanger 111 including a plurality of layers of exhaust passages 100 and a heat carrier flow passage unit 110 with a plurality of layers is provided in the housing 10a. An exhaust gas G1c flows through each of the exhaust passages 100. The heat carrier flow passage unit 110 has a plurality of layers of heat carrier flow passages 101 in which a heat carrier (e.g., a coolant) W circulates. The exhaust passages 100 and the heat carrier flow passages 101 are alternately laminated.

In FIG. 1, the gas flow-in port 11, which communicates with the bypass part main body 120 and introduces the exhaust gas G1 (G1a) into the housing 10a, is formed at an upper portion of an upstream side of the housing 10a. The gas flow-out port 12, which returns the exhaust gas G1d introduced into the housing 10a and passed through the exhaust passages 100 back to the bypass part main body 120, is formed at an upper portion of substantially the center of the housing 10a. The gas flow-in port 11 and the gas flow-out port 12 are disposed upstream of the valve 30.

In the vicinity of the gas flow-in port 11, a gas distribution chamber 15 for distributing the exhaust gas G1a flowing into the heat exchange part 10 to the plurality of exhaust passages 100 (exhaust gas G1c) is formed. In the vicinity of the downstream end of the exhaust passages 100, a gas convergence chamber 16 for converging the exhaust gas G1c flowing through the exhaust passages 100 (exhaust gas G1d) is formed. Between the uppermost exhaust passage 100 and the top surface of the housing 10a (bottom surface of bypass part main body 120), the return flow passage 17 communicating with the gas flow-out port 12 and the gas convergence chamber 16 is formed.

In the non-recovery mode in which the valve body 135 is in the open state, the exhaust gas G1d does not flow through the return flow passage 17, and the return flow passage 17 functions as the insulating air layer between the heat exchanger 111 and the main exhaust gas flow passage 20A. Therefore, the heat insulation between the bypass part 20 and the heat exchange part 10 can be improved, and the heat recovery by the heat exchanger 111 in the non-recovery mode can be suppressed. The exhaust gas G1d converged by the gas convergence chamber 16 is guided by the return flow passage 17 in a direction B1 opposite to the flow direction of the exhaust gas G1c in the exhaust passages 100 (i.e., heat exchange flow passage 10A), and flows into the bypass part main body 120 through the gas flow-out port 12. The B1 direction is also opposite to the flow direction of the exhaust gases G1f and G1g in the main exhaust gas flow passage 20A. The exhaust gas G1e flowing into the bypass part main body 120 flows in a B2 direction by the subsidiary flow passage 155 and is discharged as the exhaust gas G2.

The exhaust gas G1c flowing through the exhaust passages 100 (becomes the exhaust gas G1d converged by the gas convergence chamber 16, and thereafter) turns around in the B1 direction in the return flow passage 17. By turning around the exhaust gas G1c, the residual heat of the exhaust gas G1d flowing through the return flow passage 17 can be recovered through the end surface 100A of the exhaust passages 100, thereby improving the heat recovery efficiency. In addition, by turning around the exhaust gas G1c by the return flow passage 17, the length of exhaust heat recovery apparatus 1 in the longitudinal direction (flow direction of the exhaust gas) can be reduced, and the exhaust heat recovery apparatus 1 can be reduced in size.

As shown in FIG. 2, an introducing pipe 220 for introducing the heat carrier (coolant) W into the heat carrier flow passages 101 is provided outside the housing 10a. The introducing pipe 220 is fixed by welding or the like to a heat carrier inlet 221 which is opened in the housing 10a. Furthermore, the actuator (e.g., a thermoactuator) 200 is attached to the outer wall of the housing 10a.

(Actuator)

The thermoactuator 200 includes a rod housing 203, a coupling element 204, and a cylinder housing 200a. The rod housing 203 contains a thermal expansion medium (wax in this embodiment), a piston rod or the like which moves axially in response to thermal expansion and thermal shrinkage of the wax. The coupling element 204 is attached to the distal end of the rod and engages with a protruded operator 145 of the above-described rotation shaft 140 and rotates the rotation shaft 140.

The lower end of the cylinder housing 200a is fixed by welding or the like to a heat carrier outlet 222 which is opened in the housing 10a. A discharge pipe 202 for discharging the heat carrier W supplied from the heat carrier outlet 222 and flowing through the cylinder housing 200a is integrally provided in the center of the cylinder housing 200a. The cylinder housing 200a is fixed to the housing 10a by a metal bracket 201. The cylinder housing 200a and the rod housing 203 are joined by bolts 206 and nuts 207 via their flanges 205a and 205b.

(Operation of Exhaust Heat Recovery Apparatus)

In the exhaust heat recovery apparatus 1 having the above-described configuration, in the heat recovery mode in which the valve body 135 is held in the closed position P1 against the valve seat 31 by the biasing force of the elastic member, the exhaust gas G1 (G1f) is prevented from flowing into the bypass part main body 120 (main exhaust gas flow passage 20A) through the valve pipe 35 by the valve body 135. The exhaust gas G1 (G1a) flows into the heat exchange part 10 from the gas flow-in port 11 of the heat exchange part 10 and flows through the exhaust passages 100 as the exhaust gas G1c. Therefore, heat is exchanged between the heat carrier W flowing through the heat carrier flow passages 101 and the exhaust gas G1c flowing through the exhaust passages 100, and the heat of the exhaust gas G1 is recovered.

On the other hand, in the non-recovery mode in which the valve body 135 is rotated by the actuator 200 and held at the open position P2 (including the intermediate position between the closed position P1 and the open position P2) away from the valve seat 31, the exhaust gas G1 (G1f, G1g) flows through the bypass part main body 120 (main exhaust gas flow passage 20A) and is discharged from gas outlet port 122 as the exhaust gas G2.

Since both the gas flow-in port 11 and the gas flow-out port 12 are disposed upstream of the valve 30, even if the valve opening of the valve 30 is unstable, the differential pressure between the gas flow-in port 11 and the gas flow-out port 12 is the same. That is, since the gas flow-out port 12 is disposed upstream of the valve 30, the internal pressure in the vicinity of the gas flow-out port 12 is not affected by the exhaust gas G1g flowing out from the valve 30. Therefore, since the differential pressure of the heat exchange flow passage 10A (differential pressure between the upstream side and the downstream side of the heat exchanger 111) does not change depending on the valve opening difference, it is possible to reliably prevent the heat recovery by the heat exchanger 111 in the non-recovery mode.

Further, since the valve seat 31 is formed as an inclined portion, it is possible to relatively reduce the displacement angle when rotating the valve body 135 from the closed position P1 to the open position P2 (rotation angle). Therefore, the valve opening performance of the valve 30 is improved, and the heat recovery by the heat exchanger in the non-recovery mode can be suppressed. In addition, since the valve seat 31 is formed as an inclined portion, it is possible to increase the pressure receiving area that receives the straight-flowing component G1$f$ of the exhaust gas G1. Therefore, it is possible to reduce the load of the actuator 200 when rotating the valve body 135 from the closed position P1 to the open position P2. As a result, the actuator 200 can be reduced in size, it is possible to improve the valve opening performance of the valve 30. Furthermore, the (downstream side) opening area of the valve 30 can be increased by the inclined portion, it is possible to reduce the flow resistance.

Second Embodiment

Figure 3:
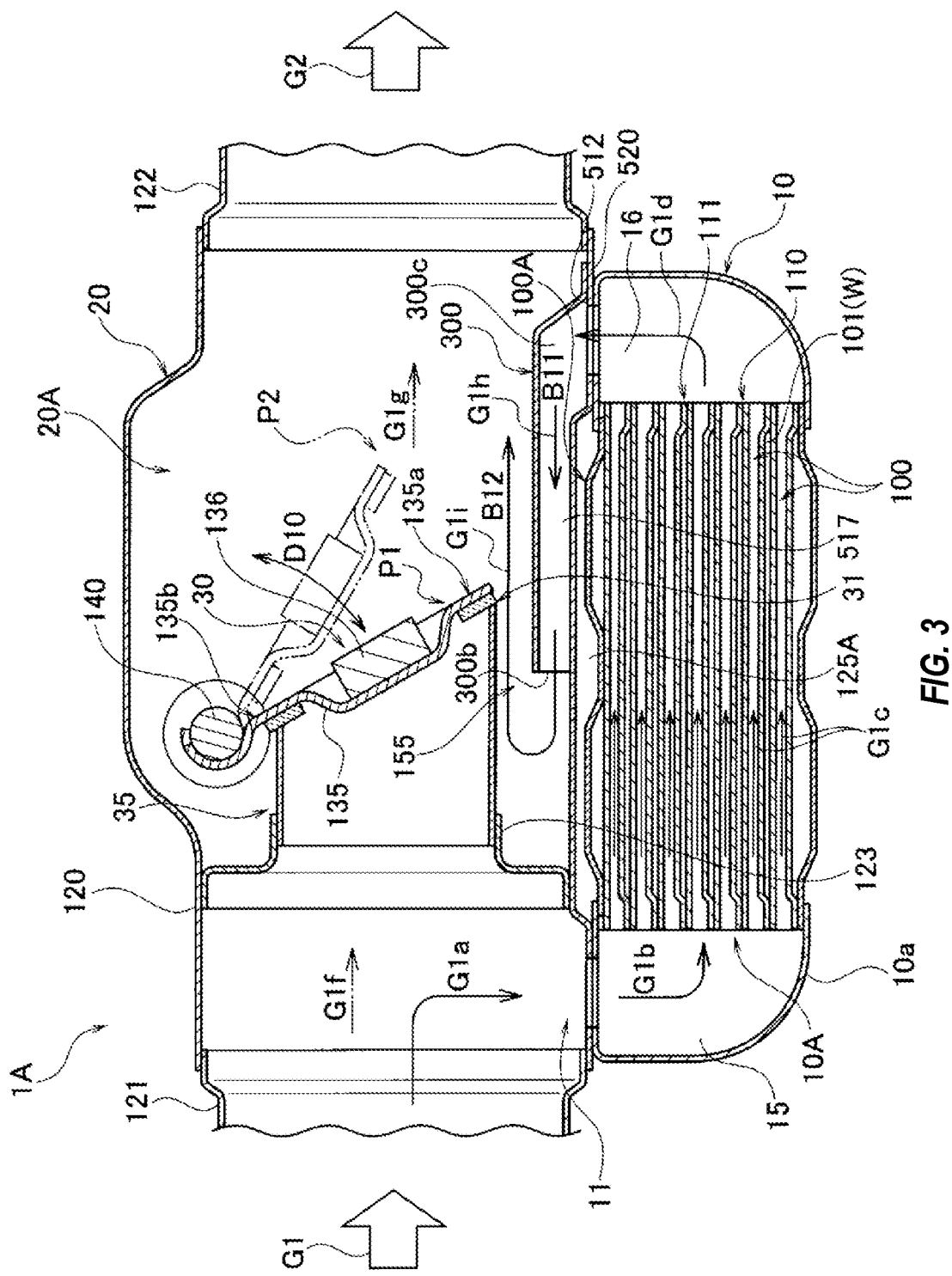
FIG. 3 is a cross-sectional view of an exhaust heat recovery apparatus according to the second embodiment.
Figure 4:
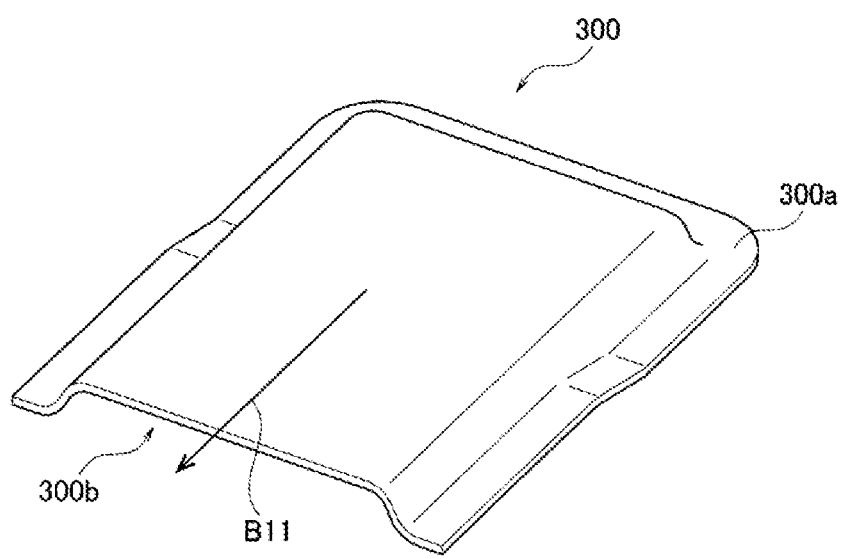
FIG. 4 is a perspective view of exhaust gas plate member of the exhaust heat recovery apparatus.

Referring to FIGS. 3 and 4, an exhaust heat recovery apparatus 1A according to the second embodiment will be described. Note that the same reference numerals are assigned to the same or equivalent components as those of the exhaust heat recovery apparatus 1 of the first embodiment, and duplicate descriptions are omitted. The exhaust heat recovery apparatus 1A in this embodiment differs from the exhaust heat recovery apparatus 1 of the first embodiment in that a return flow passage 517 is disposed on an inner wall 520 on the heat exchange part 10 side of the bypass part 20.

Specifically, as shown in FIG. 3, an exhaust gas plate member 300 (see FIG. 4) having an opening 300$b$ formed on only one end is fixed by brazing on the inner wall 520 on the heat exchange part 10 side of the bypass part 20. The exhaust gas plate member 300 is manufactured by bending a metal plate or the like. The exhaust gas plate member 300 is joined to the inner wall 520 of the bypass part 20 by a flange 300$a$ formed on the periphery avoiding the opening 300$b$. A gas flow-out port 512 is formed above the gas convergence chamber 16.

Therefore, the exhaust gas G1$d$ passing through the exhaust passages 100 flows into a space 300$c$ in the exhaust gas plate member 300 through the gas flow-out port 512. An exhaust gas G1$h$ flowing into the space 300$c$ flows in a B11 direction in the return flow passage 517 formed between the exhaust gas plate member 300 and the inner wall 520, and flows from the opening 300$b$ to the bypass part 20 (subsidiary flow passage 155 of the bypass part 20). An exhaust gas G1$i$ flowing into the bypass part 20 flows in a B12 direction through a gap (subsidiary flow passage 155) between the upper surface of the exhaust gas plate member 300 and the valve pipe 35, and is discharged as the exhaust gas G2.

In the present embodiment, the bypass part 20 and the heat exchange part 10 are slightly separated from each other. This gap functions as an insulating air layer 125A between the main exhaust gas flow passage 20A (bypass part 20) and the heat exchange flow passage 10A (heat exchange part 10). The insulating air layer 125A achieves the same effects as the insulating air layer 125 of the first embodiment. In addition, in the non-recovery mode in which the valve body 135 is in the open state, since the exhaust gases G1$d$ and G1$h$ do not flow through the return flow passage 517, the return flow passage 517 also functions as an insulating air layer between the heat exchanger 111 and the main exhaust gas flow passage 20A. Therefore, heat of the high-temperature exhaust gases G1$f$ and G1$g$ flowing through the main exhaust gas flow passage 20A can be further avoided from being transferred to the heat exchanger 111. That is, the heat recovery by the heat exchanger 111 in the non-recovery mode can be suppressed more reliably.

According to the exhaust heat recovery apparatuses 1 and 1A described above, the heat recovery by the heat exchanger in the non-recovery mode can be suppressed by improving the valve opening performance and the heat insulation of the valve 30.

The invention claimed is:

1. An exhaust heat recovery apparatus comprising:
an exhaust pipe forming a main exhaust gas flow passage in which an exhaust gas flows;
a housing attached to the exhaust pipe, the housing including a heat exchanger; and
a valve disposed in the exhaust pipe, the valve being configured to open and close the main exhaust gas flow passage, wherein
the housing has a heat exchange flow passage which branches from the main exhaust gas flow passage and converges to the main exhaust gas flow passage through the heat exchanger,
the valve has a valve pipe constituting the main exhaust gas flow passage in the exhaust pipe and a valve body which rotates to contact a seat part downstream of the valve pipe in an exhaust gas flow direction such that the exhaust gas flows to the heat exchange flow passage, and
an out port of the heat exchange flow passage which converges to the main exhaust gas flow passage is disposed upstream of a downstream side distal end of the valve pipe in the exhaust gas flow direction, and the downstream side distal end of the valve pipe in the exhaust gas flow direction is disposed upstream of a downstream side distal end of the heat exchanger in the exhaust gas flow direction.

2. The exhaust heat recovery apparatus as defined in claim 1, wherein a return flow passage, in which the exhaust gas passed through the heat exchanger flows to the out port of the heat exchange flow passage, is provided to the heat exchange flow passage, and the return flow passage is provided on the exhaust pipe side in the housing.

3. The exhaust heat recovery apparatus as defined in claim 1, wherein a return flow passage, in which the exhaust gas passed through the heat exchanger flows to the out port of the heat exchange flow passage, is provided to the heat exchange flow passage, and the return flow passage is provided on the housing side in the exhaust pipe.

4. The exhaust heat recovery apparatus as defined in claim 1, wherein the housing is fixed close to the exhaust pipe.

* * * * *